May 22, 1951  L. J. VON GUNTEN  2,554,160
METHOD OF PRODUCING TEAR-TAPE CONSTRUCTION
Filed May 4, 1949
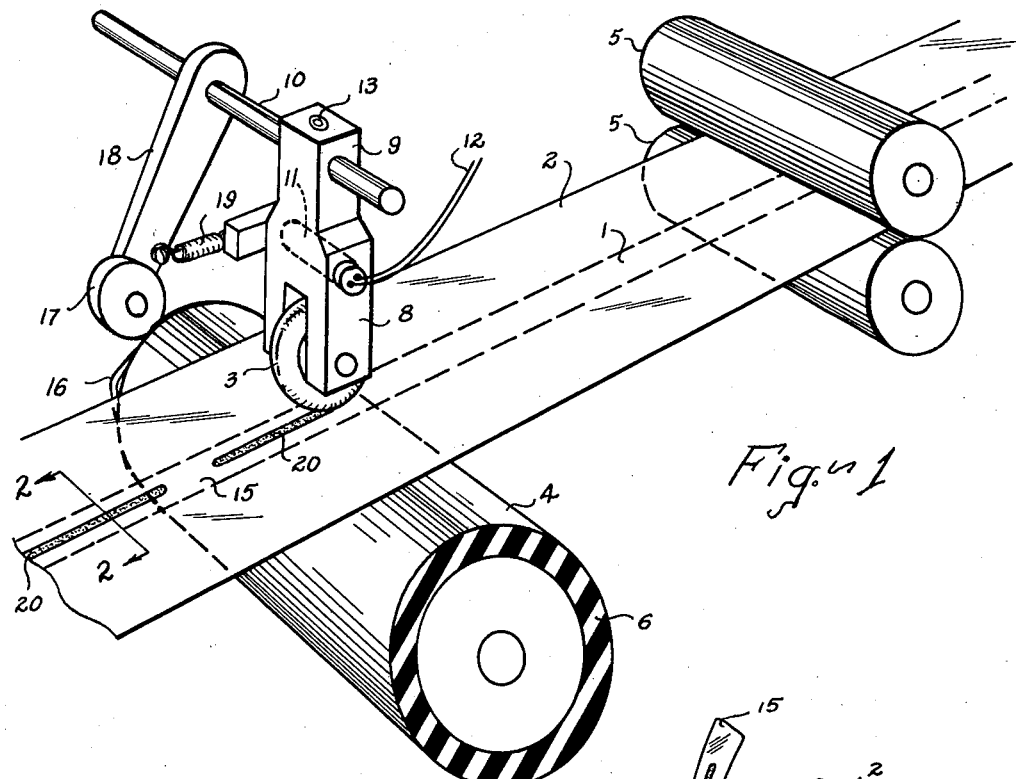
Fig. 1
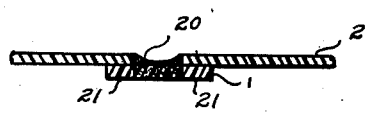
Fig. 2
Fig. 4
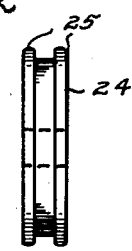
Fig. 5
Fig. 3
INVENTOR.
LEO J. VON GUNTEN
BY
R. H. Waters
atty Patented May 22, 1951

2,554,160

UNITED STATES PATENT OFFICE 2,554,160

METHOD OF PRODUCING TEAR-TAPE CONSTRUCTION

Leo J. Von Gunten, Clinton, Ohio, assignor to Wingfoot Corporation, Akron, Ohio, a corporation of Delaware Application May 4, 1949, Serial No. 91,391

5 Claims. (Cl. 154—118)

This invention relates to an improved method of applying a tear tape to a wrapper.

In producing a package according to this invention the tear tape is heat-sealed to the outer surface of the wrapper. The heat and pressure used in making the heat-seal cause the wrapper to be thinned and the bond formed between the wrapper and tape is stronger than the tearing resistance of the pressure-thinned wrapper. When the tape is subsequently used for opening the package it removes a narrow area of the wrapper with it. Although the invention will be described in connection with the use of a rubber hydrochloride tape and wrapper, any heat-sealable tape may be used and the wrapper may be any of the heat-sealable, thermoplastic films used as packaging materials. Either may be made of one of the various vinyl derivatives, cellulose esters, etc. Preferably the tear tape and wrapper are both made of the same plastic.

Tear tapes are customarily located inside the wrapper of a package. These tear tapes are effective for grained films such as regenerated cellulose, etc., which may be torn very easily and when torn tear in a straight line, but they are very unsatisfactory for films that are grainless or otherwise difficult to tear, such as unstretched films of rubber hydrochloride. Rubber hydrochloride film can be made easily tearable by stretching which imparts a grain to the film, but the unstretched film is less expensive and is widely used as a packaging material. Prior to this invention it was necessary to strengthen a tear tape for a grainless wrapper to make it capable of withstanding the tension to which it is subjected when tearing the wrapper. Even with such reinforced tape it is difficult to make a clean, straight tear in a grainless wrapper.

This invention provides a tear tape that is very satisfactory for ungrained wrapping films, but it also may be used with grained films. It is applied in such a manner that it need not be specially strengthened or reinforced and since it is on the outside of a wrapper it does not interfere with the proper sealing of the seams. The tape is preferably bonded to the wrapper by passing the tape and the wrapper into the bite of a narrow heated roller and a wider unheated roll having a resilient rubber covering, with the wrapper in contact with the heated roller. The pressure exerted on the wrapper by the narrow roller, in sealing the tear tape to it, causes the wrapper to be thinned along the seal so that the edges of the sealed portion of the wrapper are considerably weaker than the unsealed adjacent portions of the wrapper, thereby causing the sealed section to be stripped from the wrapper when the tear tape is pulled. The wrapper is sealed to a relatively thin longitudinal strip of the tape and a substantial portion of the tape's surface on each side of this strip is unsealed. It has been found that with such a bond between the tear tape and the wrapper, a tear tape of unreinforced rubber hydrochloride film has sufficient tensile strength to withstand the pull needed to tear the sealed section of the tape and wrapper cleanly and easily from the balance of the wrapper, whether this be due to the strength inherent in the unsealed portion of the tape, or to the union of the wrapper to the tape, or whatever the cause.

The wrap is advantageously bonded to the tape as it is fed into a wrapping machine so that the invention is readily adaptable to conventional packaging operations. It will be further described with reference to the accompanying drawings, in which—

Fig. 1 is a perspective view of a preferred apparatus for heat-sealing the tape to a wrapper;

Fig. 2 is a section through the wrapper and tape taken on the line 2—2 of Fig. 1;

Fig. 3 is a perspective view of a finished package and shows a tear tape partially torn from the wrapper;

Fig. 4 is a detail view of the heated roller shown in Fig. 1; and

Fig. 5 is a detail view of another preferred roller that may be used to effect a seal.

Fig. 1 illustrates a preferred apparatus for bonding a tear tape 1 to a wrapper 2. The sealing unit consists of a narrow roller 3 in pressure contact with a backing roll 4. Tear tape 1 and wrapper 2 are passed continuously through the bite of roller 3 and roll 4 where successive sections of the tape and wrapper are bonded together. The resulting sheet is preferably passed directly to a package wrapping machine. A tear tape of rubber hydrochloride film .00170 inch thick has been found to be sufficiently strong for a rubber hydrochloride wrapper of any gauge. Generally the tear tape will be $\frac{3}{16}$ inch to $\frac{1}{2}$ inch wide.

Tear tape 1 is brought under wrapper 2 and they are passed between two pinch rolls 5 and then into the bite of roller 3 and roll 4. The pinch rolls 5 maintain constant tension on the wrapper and tape during the sealing operation. Roll 4 is preferably covered with a resilient, heat-resistant rubber cover 6 since a more effective heat-seal can be made with such a resilient backing than can be made with a roll having a non-yielding surface.

The sealing unit consists of the roller 3 rotatably mounted in yoke 8 which is located at the lower end of arm 9. The upper end of arm 9 is radially and axially adjustable on cross-rod 10 which is rotatably mounted on supporting frame members (not shown) of the apparatus. A cartridge-type resistance heater 11 is mounted in the yoke 8 and connected to a suitable power source by leads 12. Thermostatic means may advantageously be provided in yoke 8 to maintain roller 3 at a constant temperature. The arm 9 may be adjusted to various radial positions on rod 10 by a setscrew 13. Thus the pressure exerted on the backing roll 4 by roller 3 may be varied.

As illustrated in Fig. 3, the wrapper 2 is applied to an object so that the tear tape 1 is outside of the package. Obviously, to form this package the wrapper 2 must be much wider with respect to the tear tape than indicated in Fig. 1. To open the package shown in Fig. 3 the tape 1 is grasped at end 15 and pulled away from the package. This end 15 is not sealed to the wrapper 2 so that it may be readily available for opening the package. It is formed by interrupting the sealing operation at periodic intervals as the tape 1 and wrapper 2 are passed through the sealing unit. Such an interruption is indicated in Fig. 1 where the portion 15 of the tear tape is not sealed to the wrapper.

To form end 15, a cam 16 is preferably located on the shaft or end of roll 4 so that it will be rotated therewith. However, cam 16 may be driven by suitable means independent of the apparatus shown. A follower 17 for cam 16 is mounted at the lower end of arm 18. The opposite end of arm 18 is secured to cross rod 10. When follower 17 rises on cam 16, arm 18 rotates cross rod 10, swinging arm 9 away from roll 4 and lifting the roller 3 out of contact with the wrapper. A spring 19 is connected between the lower portion of arm 18 and any convenient portion of the frame structure to hold follower 17 in contact with cam 16. Then, as the sealed wrapper and tape are passed into the wrapping machine, they are cut either in the middle of the unsealed portion 15 or at either end of it to form the free end 15 of the tear tape.

It will be noted in Fig. 1 that the heated roller 3 bears on the wrapper and presses it into the tape in making the heat-seal. This causes wrapper 2 to be thinned so that it is considerably weakened along the edges of the sealed portion. Wrapper 2 is united to a relatively narrow strip of the tear tape 1. A cross section of the sealed tape and the wrapper is shown in Fig. 2. The numeral 20 indicates the thinned, bonded portion of the wrapper 2. The unsealed edges 21 of the tear tape 1 and the bonded section 20 are capable of withstanding the tension to which the tape is subjected in stripping the seal 20 out of wrapper 2. This leaves a slit 23 (Fig. 3) where the area of the wrapper sealed to the tear tape is removed with it. The wrapper is torn evenly and very easily. It has been found that a tape narrower than the preferred width may be used but such a tape is not as effective as the preferred wider tape because the narrower tape may break when making the initial tear in the wrapper.

The temperature and pressure ordinarily used for uniting two plies of the rubber hydrochloride or other material employed, will not produce as desirable a bond as a somewhat higher temperature or pressure. Both the temperature and pressure may be greater than ordinarily employed. The most satisfactory conditions will be determined by the gauge and composition of the wrapping material and tape, the speed with which the materials are passed through the apparatus, etc.

Since the tear tape 1 is preferably applied to the wrapper 2 as it is fed into a wrapping machine, the speed that the materials must be passed through the sealing unit will be governed by the speed of the particular wrapping machine. To tackify a wrapper and tear tape composed of rubber hydrochloride, they will be heated above 220° F., the preferred temperature depending on their plasticizer content, etc. Because they are passed rapidly through the sealing unit, they must be heated to coalescing temperature quickly. More heat is lost by radiation and conduction than with the usual heat-sealing devices, therefore roller 3 will generally be at a considerably higher temperature than would be the heat-sealing element of the usual apparatus. The pressure exerted by roller 3 is also preferably greater than in the usual heat-sealing operation to reduce the gauge of the wrapper and weaken it. The pressure will vary with the gauge of the wrapper and the speed at which it is run.

It was found in an experimental test that a wrapper 2 of rubber hydrochloride film .00075 inch thick (known commercially as 75FF Pliofilm) could be properly heat-sealed to a tear tape of the same composition, also .00170 inch thick, at a speed of 60 feet per minute while the heated roller 3 was at approximately 350° F. and exerting a pressure of about three pounds on roll 4. The pressure exerted on roll 4 was measured by lifting it from roll 4 with a spring scale. The wrapper and tape were both made from film produced by casting a solution of rubber hydrochloride on a flat surface and then evaporating the solvent. Such film is grainless. The roller 3 was a steel disc approximately 2 inches in diameter the peripheral surface of which was flat with slightly radiused edges. The rubber-covered backing roll 4 was approximately 5 inches in diameter.

The package of Fig. 3 is of unusual design because the tear tape is not designed to facilitate removal of the wrapper, but merely to form a slit in one surface. Such a package may be used, for example, for paper tissue sheets which are to be removed from the package one at a time. This type of package is one very useful application of this invention as the tear tape can be advantageously applied to only one side of the package away from all corners and edges. In a package provided with a wrapper which is to be removed as the package is opened, the tear tape may encircle the package so that it will cut the wrapper in two.

Fig. 5 shows another preferred heating roller 24. Its peripheral surface is channeled, forming projections 25 by which a double seal is formed between the materials. These projections weaken the wrapper in the same manner as the edge of roller 3 weakens it. Wrapper 2 is imperforate after the seal is formed with either roller 3 or roller 24.

It is understood that the invention is not limited to use with rubber hydrochloride materials. This method may be used in applying a tear tape of any heat-sealable composition to any thermoplastic and heat-sealable packaging material. It may be applied to a wrapper for any object, regardless of its size or shape.

What I claim is:

1. A method of applying a heat-sealable tear tape to a thermoplastic, heat-sealable film wrapper for a package, which method comprises superimposing the tear tape and wrapper and applying heat and pressure on a portion of the surface of the wrapper away from the tear tape to bond the wrapper to the tear tape, thereby reducing the gauge of the bonded area of the wrapper and appreciably weakening the wrapper along the edges of the bonded area.

2. A method for bonding heat-sealable tear tape to a substantially grainless thermoplastic, heat-sealable film which comprises the continuous operation of heating portions of the film and the tear tape and simultaneously therewith applying pressure to a narrow area of the heated film to bond the film to the tear tape, the pressure applied to the film being sufficient to thin the narrow area and weaken it along its edges whereby the bonded area of the film is strippable from the remainder of the film by exerting tension on the tear tape.

3. A method for bonding a heat-sealable tear tape to a thermoplastic, heat-sealable film wrapper for a package, which method comprises the continuous operation of superimposing the tear tape and the wrapper, applying heat and pressure to a narrow area of the surface of the wrapper away from the tear tape to bond the wrapper to the tear tape and reduce the gauge of that area of the wrapper, weakening it along its edges, and periodically interrupting said bonding operation to provide accessible unbonded portions of the tear tape.

4. A method for bonding a heat-sealable tear tape to a grainless rubber hydrochloride film wrapper used as a packaging material, which method comprises the continuous operation of superimposing the tear tape and wrapper and applying heat and pressure to a narrow area of that surface of the wrapper away from the tear tape to bond the wrapper to the tape and reduce the gauge of that area of the wrapper and appreciably weaken the wrapper along the edges of that area to permit the bonded area of the wrapper to be broken when pull is exerted on the tear tape.

5. A method for bonding a substantially grainless rubber hydrochloride tear tape to a substantially grainless rubber hydrochloride film which comprises bringing a surface of the tear tape into flat surface contact with the film and applying heat and pressure to a narrow area of the surface of the film away from the tear tape to bond the film to the tape and reduce the gauge of the bonded area of the wrapper and appreciably weaken the wrapper along the edges of the bonded area.

LEO J. VON GUNTEN.

REFERENCES CITED

The following references are of record in the file of this patent:

UNITED STATES PATENTS

| Number | Name | Date |
| --- | --- | --- |
| 1,850,706 | Collins | Mar. 22, 1932 |
| 2,082,114 | Littlefield | June 1, 1937 |
| 2,130,932 | Sipe | Sept. 20, 1938 |
| 2,307,406 | Howard | Jan. 5, 1943 |
| 2,308,197 | Meyer | Jan. 12, 1943 |
| 2,315,116 | Flizikowski | Mar. 30, 1943 |
| 2,360,597 | Topolski | Oct. 17, 1944 |
| 2,372,737 | Phillips | Apr. 3, 1945 |
| 2,383,728 | Little | Aug. 28, 1945 |